United States Patent Office 3,370,071
Patented Feb. 20, 1968

3,370,071
3-KETO-13β-ALKYL-17β-ACETYL-GONA-4,9-DIENES AND PROCESS
Arthur A. Patchett, Cranford, and Thomas B. Windholz, Westfield, N.J., assignors to Merck & Co., Inc., Rahway, N.J., a corporation of New Jersey
No Drawing. Filed June 1, 1965, Ser. No. 460,505
3 Claims. (Cl. 260—397.4)

ABSTRACT OF THE DISCLOSURE

The invention disclosed herein is concerned with novel intermediate compounds useful in preparing novel steroid compounds of the gonane series, novel steroid compounds prepared from the novel intermediate compounds, and novel processes for preparing the intermediate and steroid compounds of the gonane series.

More particularly, this invention relates to a novel process for the synthesis of 3-keto-13β-alkyl-17β-acetyl-gona-4,9-diene compounds having 8β, 14α, and 17α-hydrogen atoms, starting with known 3-alkoxy-13β-alkyl-gona-1,3,5(10)-trien-17-one compounds or such compounds prepared by known procedures from known 3-alkoxy-13β-alkyl-gona-1,3,5(10),8,14-pentaen-17-one compounds. In this synthesis, 3-alkoxy-13β-alkyl-gona-1,3,5(10)-trien-17-one is reacted with potassium acetylide followed by an acetylating agent thereby introducing the 17β-acetoxy-17α-ethynyl function at C–17; the latter compound is reacted with bromoacetamide thereby converting the 17α-ethynyl substituent to 17α-dibromo-acetyl which upon reduction with zinc dust and acetic acid is debrominated to form a 17α-acetyl group; this 3-alkoxy-13β-alkyl-17α-acetyl-gona-1,3,5(10)-trien-17β - ol acetate is then reacted with lithium in liquid ammonia whereby the aromatic ring A is partially reduced accompanied by a simultaneous reduction and rearrangement at C–17 to form 3-alkoxy - 13β-alkyl-17β-(1-hydroxyethyl)-gona-2,5(10)-diene; hydrolysis of the last named compound with aqueous acetic acid, followed by reaction of the resulting 3-keto-Δ5(10) intermediate with bromine in pyridine, and oxidation of the 17-side chain hydroxyl with chromium trioxide produces 3 - keto-13β-alkyl-17β-acetyl-gona-4,9-diene.

This invention also relates to novel intermediate compounds, more particularly, 3-keto-13β-alkyl-17β-(1-hydroxyethyl)-gon-5(10)-ene compounds and 3-keto-13β-alkyl - 17β-(1-hydroxyethyl)-gona-4,9-diene compounds, and to novel 3-keto-13β-alkyl-17β-acetyl-gona-4,9-diene compounds in which the alkyl group on the 13-carbon atom is lower alkyl having not more than five carbon atoms, more particularly, methyl, ethyl, normal-propyl, normal-butyl, isobutyl, normal-pentyl, and isopentyl. The synthesis may be represented by the following series of reaction steps, wherein the compounds are designated by chemical formula in which $R_1$ is a lower alkyl radical having not more than five carbon atoms, more particularly, methyl, ethyl, normal-propyl, isopropyl, normal-butyl, isobutyl and isopentyl, and $R_2$ is a lower alkyl radical, preferably methyl.

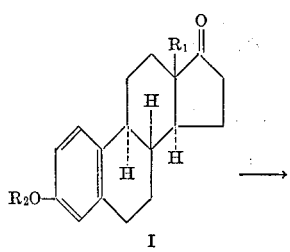

I

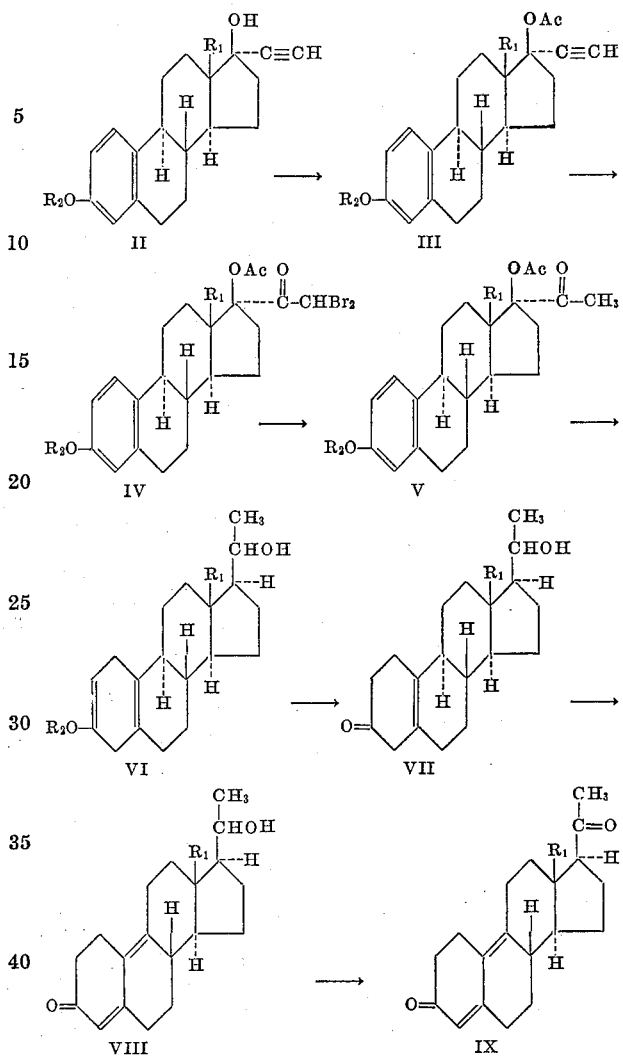

The novel compounds of this invention, 3-keto-13β-alkyl-17β-acetyl-gona-4,9-diene compounds, have utility as progestational agents and because of this property they may be used to regulate the estrus cycle in domestic animals and in cases of menstrual disturbances may be used to re-establish the normal relationships between the anterior pituitary, ovary, and endometrium which are present in a normal estrus cycle. They may also be used to syncronize the estrus cycles of a herd or colony of domestic animals or to chronically supress estrus in domestic animals. When used for these purposes, the novel compounds may be supplied together or in succession with an estrogenic hormone.

Because of the progestrone-like effects of the novel compounds of this invention, they affect the secretion of gonadotropins and thus act to regulate ovulation and endometrial and placental development. When combined with estrogens or androgens, the novel compounds of this invention reduce fertility. The novel compounds of this invention also have utility in correcting disorders such as dysmenorrhea, amenorrhea, threatened abortion, endometriosis, and the like.

The novel compounds of this invention may be administered orally or parenterally and for this purpose a wide variety of oral or parenteral dosage forms may be used in which they may be present singly, or in a mixture with another active ingredient, such as an estrogen. In the various dosage forms, they can be combined with an inert solid diluent or dissolved, dispersed, or suspended in a suitable liquid carrier. When combined with an inert solid diluent, they may be in suitable dosage unit form, more particularly in the form of a tablet, powder, capsule or the like. When combined with a liquid diluent, the composition may be in the form of a solution, emulsion, suspension or the like. The novel compounds of this invention may also be formulated into an ointment, cream, lotion, or the like, which is suitable for topical administration, and in this form they may be combined with an additional active ingredient, such as an antibiotic, germicide, or the like.

3 - alkoxy - 13β - alkyl - gona - 1,3,5(10)-trien-17-one compounds are the starting materials for the synthesis of the novel intermediate compounds and the novel 3-keto-13β-alkyl-17β-acetyl-gona-4,9-diene compounds.

The first step of the synthesis of the 3-keto-13β-alkyl-17β-acetyl-gona-4,9-diene compounds is the ethynylation of Compound I in an alcohol solution containing dissolved acetylene and potassium metal. For example, Compound I is added to a saturated acetylene solution prepared by passing a stream of acetylene gas over the surface of a stirred solution of potassium in tertiary-amyl alcohol and anhydrous ethyl ether, which is maintained at a temperature of about 0° C. until the solution is saturated with acetylene gas. After the addition of Compound I is complete, acetylene gas is passed over the reaction mixture for from three to four hours while the temperature is maintained at 0° C. and then for about eighteen hours while the temperature is kept at room temperature. Ten percent aqueous ammonium chloride solution is then added to the reaction mixture and the tertiary-amyl alcohol is removed by steam distillation. 3-alkoxy-13β-alkyl-17α-ethynyl-gona-1,3,5(10)-trien-17β-ol (Compound II) precipitates as the tertiary-amyl alcohol is distilled off and is removed by filtration.

Compound II is acetylated in a second step to provide 3 - alkoxy - 13β - alkyl - 17α - ethynyl - gona - 1,3,5(10)-trien-17β-ol acetate (Compound III). Acetylation may be accomplished by dissolving Compound II in a solution of acetic anhydride containing para-toluenesulphonic acid, distilling off almost all of the acetic anhydride, adding water in an amount sufficient to convert the remaining acetic anhydride to acetic acid, adding sufficient aqueous sodium hydroxide solution to neutralize the acetic acid, extracting with ether, drying the ether extract over anhydrous sodium sulfate and evaporating the ether. The residue is Compound III.

The third step is the bromination of Compound III with N-bromoacetamide. Bromination is conveniently accomplished by adding N-bromoacetamide to a solution of Compound III in an organic solvent, such as tertiary-butyl alcohol containing a small amount of water. The solution is stirred and 3-alkoxy-13β-alkyl-17α-dibromo-acetyl-gona-1,3,5(10)-trien-17-ol acetate (Compound IV) begins to crystallize from the reaction mixture within a few minutes. After crystallization of Compound IV is complete, water is added, the reaction mixture is cooled to about 0° C. and Compound IV is removed by filtration.

Compound IV is debrominated in a fourth step by the use of zinc dust and acetic acid. For example, by refluxing a stirred solution of Compound IV in acetic acid, containing sodium acetate, water, and zinc dust for about fifteen minutes. The reaction mixture is filtered to remove any unreacted zinc and the product is precipitated by the addition of water and removed by filtration. The debrominated product is 3-alkoxy-13β-alkyl-17α-acetyl-gona-1,3,5(10)-trien-17β-ol acetate (Compound V).

Compound V is reduced with lithium or sodium in liquid ammonia in a fifth step. For example, a solution of Compound V in an organic solvent, such as dry dioxane or dry tetrahydrofuran, is added to a solution of lithium in liquid ammonia. The reaction mixture is not cooled during addition and is allowed to stand with stirring for about one hour. Methanol is then added dropwise and after the addition of methanol is complete, additional lithium is added. The ammonia is allowed to evaporate and then water is added to the reaction mixture. The reaction product, 3 - alkoxy - 13β - alkyl-17β-(1-hydroxyethyl)-gona-2,5(10)-diene (Compound VI) separates out in solid form upon the addition of water.

The 3-enol ether structure of the A ring of Compound VI is rearranged in a sixth step to provide 3-keto-13β-alkyl-17β-(1-hydroxyethyl)-gon-5(10)-ene (Compound VII) by treatment with a weak acid, such as acetic acid or oxalic acid, in ethanol solution. For example, glacial acetic acid is added to a solution of Compound VI in absolute ethanol and after the addition is complete, a small amount of water is added. After the reaction mixture has stood for several hours, it is poured into a solution of sodium bicarbonate containing ice and allowed to stand until the reaction mixture is basic. The reaction mixture is extracted repeatedly with benzene. The benzene extracts are washed with water until the washings are only slightly basic, dried over anhydrous potassium carbonate, filtered, and concentrated to dryness under reduced pressure. The residue is Compound VII.

As a seventh step, Compound VII is treated with bromine in pyridine solution to provide 3-keto-13β-alkyl-17β-(1-hydroxyethyl)-gona-4,9-diene (Compound VIII). For example, by adding one equivalent of bromine to a solution of Compound VII in pyridine, stirring the reaction mixture at room temperature for two hours, pouring into ice water and extracting with ether. The ether extract is washed with water, dried over anhydrous sodium sulfate, and concentrated to dryness under reduced pressure. The residue is 3-keto-13β-alkyl-17β-(1-hydroxyethyl)-gona-4,9-diene (Compound VIII).

As a final step, Compound VIII is oxidized with chromium trioxide to provide 3-keto-13β-alkyl-17β-acetyl-gona-4,9-diene (Compound IX). For example, a solution of chromium trioxide in dilute sulphuric acid solution is added to a solution of Compound VIII in acetone and when the oxidation reaction is complete, the reaction mixture is diluted with water. Compound IX precipitates in crystalline form from the aqueous reaction mixture and is removed by filtration. Compound IX may be purified by passing a benzene solution of Compound IX through a short column of alumina.

The 3-alkoxy - 13β - alkyl-gona-1,3,5(10)-trien-17-one compounds having 8β, 9α and 14α hydrogen atoms may be prepared from known 3-alkoxy-13β-alkyl-gona-1,3,5(10),8,14-pentaen-17-one (Compound IX) by a known procedure which is represented by the following series of reaction steps wherein the reactants are designated by chemical formulae in which $R_1$ and $R_2$ have the same significance as above:

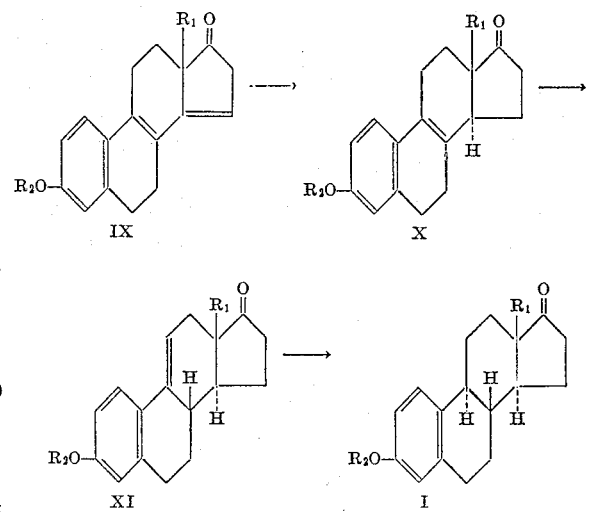

The first step in the preparation of the 3-alkoxy-13β-alkyl-gona-1,3,5(10)-trien-17-one compounds is the catalytic hydrogenation of Compound IX in solution in a hydrocarbon solvent, such as benzene or toluene, by the use of a catalyst, such as 2% palladised calcium carbonate. The reaction may be conducted at room temperature and is continued until the theoretical amount of hydrogen has been absorbed. The hydrogenation product is 3-alkoxy - 13β - alkyl-gona - 1,3,5(10),8 - tetraen-17-one (Compound X).

The second step is the rearrangement of the $\Delta^8$ double-bond of Compound X to the $\Delta^{9(11)}$ position by the treatment of Compound X with methanolic hydrochloric acid. The rearranged product is 3-alkoxy-13β-alkyl-gona-1,3, 5(10),9(11)-tetraen-17-one (Compound XI).

The $\Delta^{9(11)}$ double-bond of Compound XI is hydrogenated as a third step. This may be accomplished by shaking an ethanol solution of Compound XI with hydrogen in the presence of 10% palladised charcoal as a catalyst. The reaction is continued until no more hydrogen is absorbed. The reaction product is 3-alkoxy-13β-alkyl-gona-1,3,5(10)-trien-17-one (Compound I).

The following examples illustrate methods of carrying out the present invention but it is to be understood that these examples are given for purposes of illustration and not of limitation.

Example 1.—*3-methoxy-13β-isopropyl-gona-1,3,5(10),8-tetraen-17-one*

Seventy grams of 3-methoxy-13β-isopropyl-gona-1,3,5 (10),8,14-pentaen-17-one in solution in 200 ml. of benzene containing 22.5 g. of 2% palladised calcium carbonate is shaken with hydrogen until 5.7 liters of hydrogen is adsorbed. The reaction mixture is filtered and the benzene is removed by distillation under reduced pressure. The residue is 3-methoxy-13β-isopropyl-gona-1,3,5(10),8-tetraen-17-one and is crystallized from methanol.

Example 2.—*3-methoxy-13β-isopropanol-gona-1,3,5(10), 9(11)-tetraen-17-one*

A solution of 0.25 g. of 3-methoxy-13β-isopropyl-gona-1,3,5(10),8-tetraen-17-one in 100 ml. of methanolic hydrochloric acid is refluxed for forty-five minutes. The solution is then evaporated to dryness under reduced pressure. The residue is 3-methoxy-13β-isopropyl-gona-1,3, 5(10),9(11)-tetraen-17-one and is crystallized from methanol.

Example 3.—*3-methoxy-13β-isopropyl-gona-1,3,5(10)-trien-17-one*

One gram of 3-methoxy-13β-isopropyl-gona-1,3,5(10), 9(11)-tetraen-17-one in 50 ml. ethanol containing 0.5 g. of 10% palladised charcoal is shaken with hydrogen until no more hydrogen is adsorbed. The solution is filtered and the alcohol is removed by evaporation under reduced pressure. The residue is 3-methoxy-13β-isopropyl-gona-1,3,5(10)-trien-17-one and is crystallized from methanol.

Example 4.—*3-methoxy-13β-isopropyl-17α-ethynylgona-1,3,5(10)-trien-17β-ol*

Five grams of 3-methoxy-13β-isopropyl-gona-1,3,5(10)-trien-17-one are added to a saturated acetylene solution prepared by passing a slow stream of acetylene over the surface of a stirred solution of potassium tertiary-amylate containing 5 g. of potassium in solution in 100 ml. of tertiary-amyl alcohol and 100 ml. of ether while the temperature is maintained at 0° C. After the addition is complete, acetylene gas is passed over the reaction mixture for four hours, during which time the temperature of the reaction mixture is maintained at 0° C., and then acetylene gas is passed over the reaction mixture for a period of eighteen hours, during which time the temperature of the reaction mixture is maintained at room temperature. One hundred ml. of 10% aqueous ammonium chloride solution are added to the reaction mixture and the tertiary-amyl alcohol is removed by steam distillation. The reaction product, 3-methoxy-13β-isopropyl-17α-ethynylgona-1,3,5(10)-trien-17β-ol, is removed by filtration and crystallized from acetone.

Example 5.—*3-methoxy-13β-isopropyl-17α-ethynylgona-1,3,5(10)-trien-17β-ol acetate*

Five grams of 3-methoxy-13β-isopropyl-17α-ethynyl-gona-1,3,5(10)-trien-17β-ol is allowed to stand overnight in solution in 50 ml. of acetic anhydride containing 2 g. of para-toluenesulfonic acid. The reaction mixture is poured into 200 ml. of water and after one hour the reaction product is removed by filtration and recrystallized from a solution of methanol and ethyl acetate. The crystalline material is 3-methoxy-13β-isopropyl-17α-ethynyl-gona-1,3,5(10)-trien-17β-ol acetate.

Example 6.—*3-methoxy-13β-isopropyl-17α-dibromo-acetylgona-1,3,5(10)-trien-17β-ol acetate*

1.6 grams of N-bromoacetamide is added to a solution of 2 g. of 3-methoxy-13β-isopropyl-17α-ethynylgona-1,3, 5(10)-trien-17β-ol acetate in 75 ml. of tertiary-butyl alcohol containing one ml. of water. The reaction product commences to crystallize from the reaction mixture after the reaction mixture has been stirred for a few minutes and after the reaction mixture is stirred for one hour, 25 ml. of water are added. The reaction mixture is cooled to 0° C. and the precipitate is removed by filtration and washed with methanol. The precipitate is 3-methoxy-13β-isopropyl - 17α - dibromoacetylgona - 1,3,5(10)-trien-17β-ol acetate and may be recrystallized from methylene chloride-methanol.

Example 7.—*3-methoxy-13β-isopropyl-17α-acetylgona-1,3,5(10)-trien-17β-ol acetate*

2.75 grams of 3-methoxy-13β-isopropyl-17α-dibromoacetylgona-1,3,5(10)-trien-17β-ol acetate in solution in 100 ml. of acetic acid containing 2.5 g. of anhydrous sodium acetate, 10 ml. of water and 3.5 g. of zinc dust, is stirred for fifteen minutes on a steam bath. The unreacted zinc is then removed by filtration and sufficient water is added to the reaction mixture to completely precipitate the reaction product. The precipitate is removed by filtration and recrystallized from methanol-ethyl acetate. The reaction product is 3-methoxy-13β-isopropyl-17α-acetyl-gona-1,3,5(10)-trien-17β-ol acetate.

Example 8.—*3-methoxy-13β-isopropyl-17β-(1-hydroxy-ethyl)-gona-2,5(10)-diene*

A solution of 2 g. of 3-methoxy-13β-isopropyl-17α-acetylgona-1,3,5(10)-trien-17β-ol acetate in 20 ml. of dry dioxane is added without external cooling to a solution of one gram of lithium in 500 ml. of liquid ammonia. The reaction mixture is stirred for one hour and 50 ml. of methanol are then added dropwise over a period of fifteen minutes followed by the addition of 4 g. of finely divided lithium. After the lithium is added, the reaction mixture is stirred for one-half hour and the ammonia is allowed to evaporate. Fifty ml. of water are added to the reaction mixture and the precipitate which is formed is removed by filtration. The precipitate is 3-methoxy-13β-isopropyl-17β-(1-hydroxyethyl)-gona-2,5(10)-diene.

Example 9.—*3-keto-13β-isopropyl-17β-(1-hydroxy-ethyl-gon-5(10)-ene*

3.2 milliliters of glacial acetic acid are added to a solution of 160 mg. of 3-methoxy-13β-isopropyl-17β-(1-hydroxyethyl)-gona-2,5(10)-diene in 1.6 ml. of dioxane and 7.2 ml. of absolute ethanol. The reaction mixture is allowed to stand at room temperature for five hours and then poured into an aqueous solution of sodium bicarbonate containing ice. This solution is allowed to stand until it is basic and then extracted with benzene. The benzene extract is washed with water until the washings are slightly basic and then dried over anhydrous potassium carbonate, filtered and concentrated to dryness under reduced pressure. The residue is 3-keto-13β-isopropyl-17β-(1-hydroxyethyl)-gon-5(10)-ene and is crystallized from ether.

*Example 10.—3-keto-13β-isopropyl-17β-(1-hydroxyethyl)-gona-4,9-diene*

One molecular equivalent of bromine is added to 100 mg. of 3-keto-13β-isopropyl-17β-(1-hydroxyethyl)-gon-5(10)-ene in solution in five ml. of pyridine. The reaction mixture is stirred for two hours at room temperature and poured into ice water. The aqueous mixture is extracted with ether, the ether extract is washed with water, dried over anhydrous sodium sulphate, and the ether is removed by distillation under reduced pressure. The residue is 3-keto-13β-isopropyl-17β-(1-hydroxyethyl)-gona-4,9-diene.

*Example 11.—3-keto-13β-isopropyl-17β-acetyl-gona-4,9-diene*

A solution of 4.5 g. of chromium trioxide and 22 ml. of water containing 4 ml. of concentrated sulphuric acid is added slowly to a solution of 10 g. of 3-keto-13β-isopropyl-17β-(1-hydroxyethyl)-gona-4,9-diene in 40 ml. of acetone. The reaction mixture is stirred during the addition and stirring is continued for 15 minutes after addition is complete. One hundred milliliters of water are then added and the diluted reaction mixture is extracted with ether. The ether extract is dried over magnesium sulphate and the ether is removed by distillation under reduced pressure. The residue is 3-keto-13β-isopropyl-17β-acetyl-gona-4,9-diene and is crystallized from acetone-hexane after chromatography on aluminum.

*Example 12.—3-methoxy-13β-normal butyl-17α-ethynyl-gona-1,3,5(10)-trien-17β-ol*

Five grams of 3-methoxy-13β-normal butyl-gona-1,3,5(10)-trien-17-one are added to a saturated acetylene solution prepared by passing a slow stream of acetylene over the surface of a stirred solution of potassium tertiary-amylate containing 5 g. of potassium in solution in 100 ml. of tertiary-amyl alcohol and 100 ml. of ether while the temperature is maintained at 0° C. After the addition is complete, acetylene gas is passed over the reaction mixture for four hours, during which time the temperature of the reaction mixture is maintained at room temperature. One hundred ml. of 10% aqueous ammonium chloride solution are added to the reaction mixture and the tertiary-amyl alcohol is removed by steam distillation. The reaction product, 3-methoxy-13β-normal butyl-17α-ethynylgona-1,3,5(10)-trien-17β-ol is removed by filtration and crystallized from acetone.

*Example 13.—3-methoxy-13β-normal butyl-17α-ethynyl-gona-1,3,5(10)-trien-17β-ol acetate*

Five grams of 3-methoxy-13β-normal butyl-17α-ethynylgona-1,3,5(10)-trien-17β-ol is allowed to stand overnight in solution in 50 ml. of acetic anhydride containing 2 g. of para-toluenesulfonic acid. The reaction mixture is poured into 200 ml. of water and after one hour the reaction product is removed by filtration and recrystallized from a solution of methanol and ethyl acetate. The crystalline material is 3-methoxy-13β-normal butyl-17α-ethynylgona-1,3,5(10)-trien-17β-ol acetate.

*Example 14.—3-methoxy-13β-normal butyl-17β-dibromoacetylgona-1,3,5(10)-trien-17β-ol acetate*

1.6 grams of N-bromoacetamide is added to a solution of 2 g. of 3-methoxy-13β-normal butyl-17α-ethynylgona-1,3,5(10)-trien-17β-ol acetate in 75 ml. of tertiary-butyl alcohol containing one ml. of water. The reaction product commences to crystallize from the reaction mixture after the reaction mixture has been stirred for a few minutes and after the reaction mixture is stirred for one hour, 25 ml. of water are added. The reaction mixture is cooled to 0° C. and the precipitate is removed by filtration and washed with methanol. The precipitate is 3-methoxy-13β-normal butyl-17α-dibromoacetylgona-1,3,5(10)-trien-17β-ol acetate and may be recrystallized from methylene-chloride methanol.

*Example 15.—3-methoxy-13β-normal butyl-17α-acetylgona-1,3,5(10)-trien-17β-ol acetate*

2.75 grams of 3-methoxy-13β-normal butyl-17α-dibromoacetylgona-1,3,5(10)-trien-17β-ol acetate in solution in 100 ml. of acetic acid containing 2.5 g. of anhydrous sodium acetate, 10 ml. of water and 3.5 g. of zinc dust is stirred for fifteen minutes on a steam bath. The unreacted zinc is then removed by filtration and sufficient water is added to the reaction mixture to completely precipitate the reaction product. The precipitate is removed by filtration and recrystallized from methanol-ethyl acetate. The reaction product is 3-methoxy-13β-normal butyl-17α-acetylgona-1,3,5(10)-trien-17β-ol acetate.

*Example 16.—3-methoxy-13β-normal butyl-17β-(1-hydroxyethyl)-gona-2,5(10)-diene*

A solution of 2 g. of 3-methoxy-13β-normal butyl-17α-acetylgona-1,3,5(10)-trien-17β-ol acetate in 20 ml. of dry dioxane is added without external cooling to a solution of one gram of lithium in 500 ml. of liquid ammonia. The reaction mixture is stirred for one hour and 50 ml. of methanol are then added dropwise over a period of fifteen minutes followed by the addition of 4 g. of finely divided lithium. After the lithium is added, the reaction mixture is stirred for one-half hour and the ammonia is allowed to evaporate. Fifty ml. of water are added to the reaction mixture and the precipitate which is formed is removed for filtration. The precipitate is 3-methoxy-13β-normal butyl-17β-(1-hydroxyethyl)-gona-2,5(10)-diene.

*Example 17.—3-keto-13β-normal butyl-17β-(1-hydroxyethyl)-gon-5(10)-ene*

3.2 milliliters of glacial acetic acid are added to a solution of 160 mg. of 3-methoxy-13β-normal butyl-17β-(1-hydroxyethyl)-gona-2,5(10)-diene in 1.6 ml. of dioxane and 7.2 ml. of absolute ethanol. The reaction mixture is allowed to stand at room temperature for five hours and then poured into the aqueous solution of sodium bicarbonate containing ice. This solution is allowed to stand until it is basic and then extracted with benzene. The benzene extract is washed with water until the washings are slightly basic and then dried over anhydrous potassium carbonate, filtered and concentrated to dryness under reduced pressure. The residue is 4-keto-13β-normal butyl-17β-(1-hydroxyethyl)-gon-5(10)-ene and is crystallized from ether.

*Example 18.—3-keto-13β-normal butyl-17β-(1-hydroxyethyl)-gona-4,9-diene*

One molecular equivalent of bromine is added to 100 mg. of 3-keto-13β-normal butyl-17β-(1-hydroxyethyl)-gon-5(10)-ene in solution in five ml. of pyridine. The reaction mixture is stirred for two hours at room temperature and poured into ice water. The aqeous mixture is extracted with ether, the ether extract is washed with water, dried over anhydrous sodium sulphate, and the ether is removed by distillation under reduced pressure. The residue is 3-keto-13β-normal butyl-17β-(1-hydroxyethyl)-gona-4,9-diene.

Example 19.—3-keto-13β-normal butyl-17β-acetyl-gona-4,9-diene

A solution of 4.5 g. of chromium trioxide and 22 ml. of water containing 4 ml. of concentrated sulphuric acid is added slowly to a solution of 10 g. of 3-keto-13β-normal butyl-17β-(1-hydroxyethyl)-gona-4,9-diene and 40 ml. of acetone. The reaction mixture is stirred during the addition and stirring is continued for 15 minutes after addition is complete. One hundred milliliters of water are then added and the diluted reaction mixture is extracted with ether. The ether extract is dried over magnesium sulphate and the ether is removed by distillation under reduced pressure. The residue is 3-keto-13β-normal-butyl-17β-acetyl-gona-4,9-diene and is crystallized from acetone-hexane after chromatography on aluminum.

Example 20.—3-methoxy-13β-methyl-17α-ethynyl-gona-1,3,5(10)-trien-17β-ol

Five grams of 3-methoxy-13β-methyl-gona-1,3,5(10)-trien-17-one are added to a saturated acetylene solution prepared by passing a slow stream of acetylene over the surface to a stirred solution of potassium tertiary-amylate containing 5 g. of potassium in solution in 100 ml. of tertiary-amyl alcohol and 100 ml. of ether while the temperature is maintained at 0° C. After the addition is complete, acetylene gas is passed over the reaction mixture for four hours, during which time the temperature of the reaction mixture is maintained at 0° C., and then acetylene gas is passed over the reaction mixture for a period of eighteen hours, during which time the temperature of the reaction mixture is maintained at room temperature. One hundred ml. of 10% aqueous ammonium chloride solution is added to the reaction mixture and the tertiary-amyl alcohol is removed by steam distillation. The reaction product, 3 - methoxy - 13β - methyl - 17α - ethynylgona-1,3,5(10)-trien-17β-ol, is removed by filtration and crystallized from acetone.

Example 21.—3-methoxy-13β-methyl-17α-ethynyl-gona-1,3,5(10)-trien-17β-ol acetate Five grams of 3-methoxy-13β-methyl-17α-ethynylgona-1,3,5(10)-trien-17β-ol is allowed to stand overnight in solution in 50 ml. of acetic anhydride containing 2 g. of para-toluenesulfonic acid. The reaction mixture is poured into 200 ml. of water and after one hour the reaction product is removed by filtration and recrystallized from a solution of methanol and ethyl acetate. The crystalline material is 3 - methoxy-13β - methyl - 17α - ethynylgona-1,3,5(10)-trien-17β-ol acetate.

Example 22.—3-methoxy-13β-methyl-17α-dibromoacetyl-gonia-1,3,5(10)-trien-17β-ol acetate 1.6 grams of N-bromoacetamide is added to a solution of 1 g. of 3-methoxy-13β-methyl-17α-ethynylgonia-1,3,5-(10)-trien 17β-ol acetate in 75 ml. of tertiary-butyl alcohol containing one ml. of water. The reaction product commences to crystallize from the reaction mixture after the reaction mixture has been stirred for a few minutes and after the reaction mixture is stirred for one hour, 25 ml. of water are added. The reaction mixture is cooled to 0° C. and the precipitate is removed by filtration and washed with methanol. The precipitate is 3-methoxy-13β-methyl - 17α - dibromoacetylgonia-1,3,5(10)-trien-17β-ol acetate and may be recrystallized from methylene chloride-methanol.

Example 23.—3-methoxy-13β-methyl-17α-acetylgonia-1,3,5(10)-trien-17β-ol acetate 2.75 grams of 3-methoxy-13β-methyl-17α-dibromoacetylgona-1,3,5(10)-trien-17β-ol acetate in solution in 100 ml. of acetic acid containing 2.5 g. of anhydrous sodium acetate, 10 ml. of water and 3.5 g. of zinc dust, is stirred for fifteen minutes on a steam bath. The unreacted zinc is then removed by filtration and sufficient water is added to the reaction mixture to completely precipitate the reaction product. The precipitate is removed by filtration and recrystallized from methanol-ethyl acetate. The reaction product is 3-methoxy-13β-methyl-17α-acetylgona-1,3,5(10)-trien-17β-ol acetate.

Example 24.—3-methoxy-13β-methyl-17β-(1-hydroxyethyl)-gona-2,5(10)-diene

A solution of 2 g. of 3-methoxy-13β-methyl-17α-acetyl-gona-1,3,5(10)-trien-17β-ol acetate in 20 ml. of dry dioxane is added without external cooling to a solution of one gram of lithium in 500 ml. of liquid ammonia. The reaction mixture is stirred for one hour and 50 ml. of methanol are then added dropwise over a period of fifteen minutes followed by the addition of 4 g. of finely divided lithium. After the lithium is added, the reaction mixture is stirred for one-half hour and the ammonia is allowed to evaporate. Fifty ml. of water are added to the reaction mixture and the precipitate which is formed is removed by filtration. The precipitate is 3-methoxy-13β-methyl-17β-(1-hydroxyethyl)-gona-2,5(10)-diene.

Example 25.—3-keto-13β-methyl-17β-(1-hydroxyethyl)-gon-5(10)-ene 3.2 milliliters of glacial acetic acid are added to a solution of 160 mg. of 3-methoxy-13β-methyl-17β-(1-hydroxyethyl)-gona-2,5(10)-diene in 1.6 ml. of dioxane and 7.2 ml. of absolute ethanol. The reaction mixture is allowed to stand at room temperature for five hours and then poured into an aqueous solution of sodium bicarbonate containing ice. This solution is allowed to stand until it is basic and then extracted with benzene. The benzene extract is washed with water until the washings are slightly basic and then dried over anhydrous potassium carbonate, filtered and concentrated to dryness under reduced pressure. The residue is 3-keto-13β-methyl-17β-(1-hydroxyethyl)-gon-5(10)-ene and is crystallized from ether.

Example 26.—3-keto-13β-methyl-17β-(1-hydroxyethyl)-gon-4,9-diene

One molecular equivalent of bromine is added to 100 mg. of 3 - keto - 13β-methyl-17β-(1-hydroxyethyl)-gon-5(10)-ene in solution in five ml. of pyridine. The reaction mixture is stirred for two hours at room temperature and poured into ice water. The aqueous mixture is extracted with ether, the ether extract is washed with water, dried over anhydrous sodium sulphate, and the ether is removed by distillation under reduced pressure. The residue is 3-keto 13β-mbethyl-17β-(1-hydroxyethyl)-gona-4,9-diene.

Example 27.—3-keto-13β-methyl-17β-acetyl-gona-4,9-diene

A solution of 4.5 g. of chromium trioxide and 22 ml. of water containing 4 ml. of concentrated sulphuric acid is added slowly to a solution of 10 g. of 3-keto-13β-methyl-17β-(1-hydroxyethyl)-gona-4,9-diene and 40 ml. of acetone. The reaction mixture is stirred during the addition and stirring is continued for 15 minutes after addition is complete. One hundred milliliters of water are then added and the diluted reaction mixture is extracted with ether. The extract is dried over magnesium sulphate and the ether is removed by distillation under reduced pressure. The residue is 3-keto-13β-methyl-17β-acetyl-gona-4,9-diene and is crystallized from acetone-hexane after chromatography on aluminum.

Various changes ad modifications may be made in carrying out the present invention without departing from the spirit and scope thereof. Insofar as these changes and modifications are within the purview of the annexed claims, they are to be considered as part of our invention.

We claim:
1. A compound of the formula:

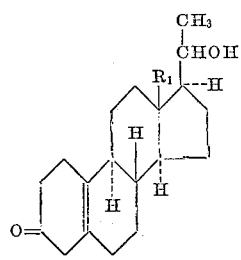

wherein $R_1$ is a lower alkyl radical having not more than five carbon atoms.

2. 3-keto-13$\beta$-methyl-17$\beta$-(1-hydroxyethyl)-gon-5(10)-ene.

3. 3-keto-13$\beta$-isopropyl-17$\beta$-(1-hydroxyethyl)-gon-5(10)-ene.

References Cited

UNITED STATES PATENTS

| | | | |
|---|---|---|---|
| 3,086,027 | 4/1963 | Perelman et al. | 260—397.4 |
| 3,102,125 | 8/1963 | Kincl et al. | 260—397.4 |
| 3,189,528 | 6/1965 | Smith et al. | 260—397.4 |
| 3,243,433 | 3/1966 | Fried et al. | 260—397.4 |
| 3,277,122 | 10/1966 | Alvarez | 260—397.3 |
| 3,300,518 | 1/1967 | Fried et al. | 260—397.4 |

LEWIS GOTTS, *Primary Examiner.*

J. R. BROWN, *Assistant Examiner.*